United States Patent [19]

Schadegg

[11] Patent Number: 4,529,004

[45] Date of Patent: Jul. 16, 1985

[54] PNEUMATIC TIMING VALVES

[75] Inventor: Rudolf Schadegg, Wohlenag, Switzerland

[73] Assignee: H. Kuhnke Electrotechnik GmbH, Schweiz, Fed. Rep. of Germany

[21] Appl. No.: 537,941

[22] Filed: Sep. 30, 1983

[30] Foreign Application Priority Data

Oct. 27, 1982 [DE] Fed. Rep. of Germany ....... 3239668

[51] Int. Cl.³ ............ F16K 31/34

[52] U.S. Cl. ............ 137/624.11; 251/55; 251/20

[58] Field of Search ............ 137/624.11, 624.12; 251/48, 55, 15, 20, 23

[56] References Cited

U.S. PATENT DOCUMENTS 4,018,249 4/1977 Lamegre ............ 137/624.11

*Primary Examiner*—Alan Cohan

*Attorney, Agent, or Firm*—Balogh, Osann, Kramer, Dvorak, Genova & Traub

[57] ABSTRACT

This invention describes a pneumatic timing valve, in which one end of a plunger projects into a chamber in constant communication with the atmosphere and is displaced by fluid means into its operating position against a return spring force, an incoming pneumatic pressure signal initially being vented via the chamber. A shutter element situated in the chamber and controlled as regards time by another spring force and a restrictor system, neutralizes the venting of the pressure signal after expiration of a preset delay period, to generate a control signal. The restrictor system is separately in communication with the atmosphere and comprises a restrictor path adjustable in its effective length. In order that shorter time-lags may be set precisely within a comparatively large delay range, the invention provides that the operating position of the plunger is adjustable.

6 Claims, 3 Drawing Figures

PNEUMATIC TIMING VALVES

BACKGROUND OF THE INVENTION

The present invention relates to pneumatic timing valves of the kind in which one end of a plunger which projects into a chamber in constant communication with the atmosphere is displaced by fluid means acting against a return spring force, into an operating position, an incoming pressure signal initially being relieved via the chamber, and wherein a shutter element situated in the chamber and controlled with respect to time by another spring force and a restrictor system neutralizes the relief of the pressure signal after a set delay period has elapsed to generate a control signal, the restrictor system incorporating a restrictor path which is adjustable in its effective length and separately in communication with the atmosphere. Hereinafter such timing valves will be referred to as "of the kind described".

In timing valves of the kind described, the delay period set in each case is controlled by means of the atmosphere, of a groove-like longer restrictor path and a negative pressure chamber comprising a spring-loaded wall surface which carries a shutter element. Upon relieving the wall surface as a result of a displacement of the plunger by a particular distance, atmospheric air flows via the restrictor groove into the chamber, in view of the spring force acting on the wall surface and of the negative pressure thus produced in the chamber. A delay period unaffected by the operating fluid is thereby obtained. It is possible moreover to secure a comparatively long delay period by means of a correspondingly great stroke of the plunger, which may for example amount to 180 seconds.

It is a disadvantage of such a timing valve however, that delay periods which are substantially shorter than the maximum possible delay of the valve in question, can only be set in an imprecise manner. This may be attributed to the fact that in the case of shorter delay periods, the effective flow path of the restrictor groove has to be adjusted to a substantially lower value so that the negative pressure chamber may be filled rapidly with atmospheric air, to ensure that the constant stroke travel of the plunger brought into the operating position may be overbridged with corresponding speed by the following shutter element, for the purpose of terminating the delay period set. It is consequently necessary to select timing valves having a smaller maximum delay period range for cases of application involving comparatively short delay periods, which moreover establishes the need for several timing valve sizes.

It is an object of the invention to improve an atmospherically controlled timing valve having a comparatively long delay period in particular, in which the setting precision is increased considerably for delay period values below the maximum possible delay period of the valve.

SUMMARY OF THE INVENTION

To fulfil this and other objects, the invention consists in a pneumatic timing valve of the kind described, wherein the operating position of the plunger is adjustable.

In a preferred embodiment of the invention, a stop adjustable manually in the direction of the displacement of the plunger is provided within the housing of the timing valve, the other end of the plunger coming into contact with the stop.

Delay period values lying considerably below the maximum possible delay period may thereby also be set with substantially improved precision, in particular within the initial range of the possibility of adjustment of the valve in question. It is now no longer necessary for the shutter element of the timing member to have to travel the same path distance up to its contact with the plunger for each delay period set: on the contrary, adjustment of the displaceable stop shortens or lengthens the stroke distance of the plunger and thereby the corresponding trajectory of the shutter element commensurately, so that the whole restrictor path of the longer restrictor groove known per se may in each case be allocated to each stroke displacement of the plunger. This provides a possibility of precise setting of the delay period required, which is of special advantage in particular in the case of valves which are intended to have a wide range of adjustment for delay periods, e.g. 180 seconds and longer. The procedure followed in practice will be such that the delay period setting scale is formed as a multiple scale, e.g. as a triple scale, the initial values of which start at zero in each case and the terminal values of which may be selected at will. A corresponding position of the stop device in accordance with the invention is then matched to these scales.

BRIEF DESCRIPTION OF THE DRAWINGS

In order that the invention may be more clearly understood reference will now be made to the accompanying drawings which show one embodiment thereof by way of example and in which.

DETAILED DESCRIPTION OF THE PREFERRED EMBODIMENT

Figure 1:
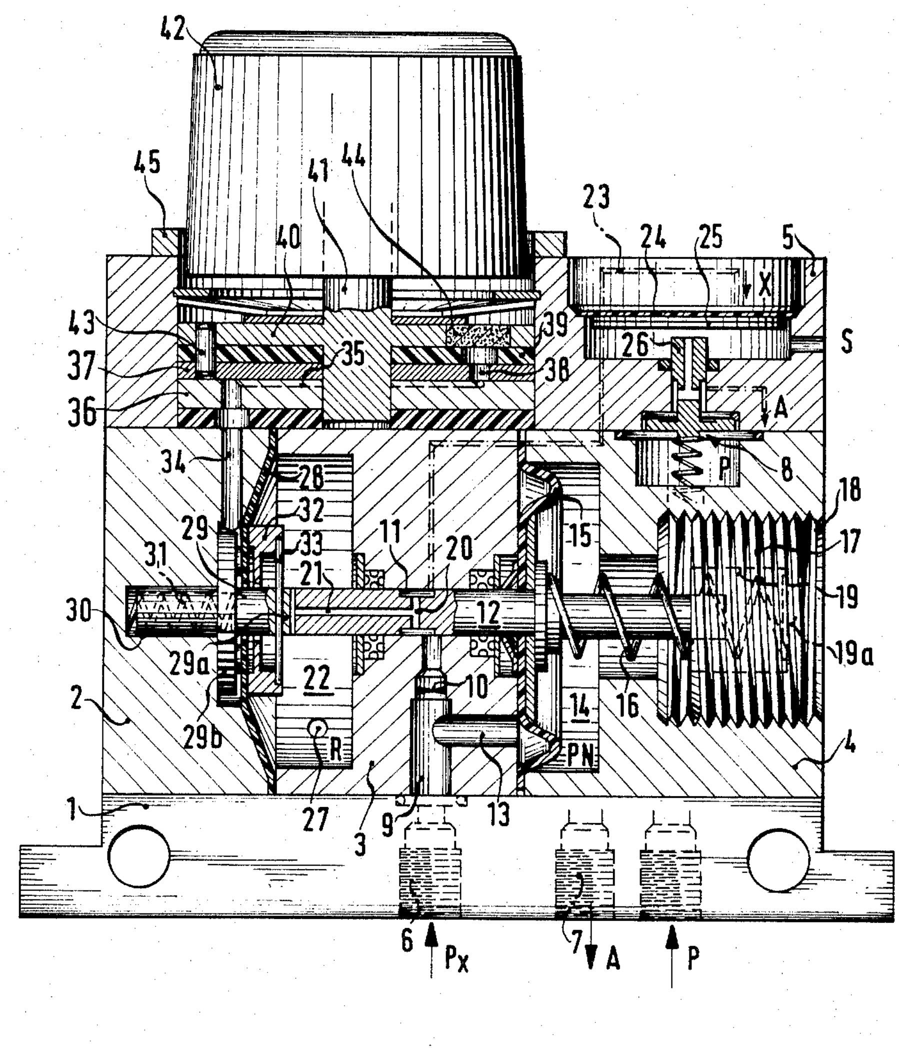
FIG. 1 shows the embodiment substantially in axial cross-section, illustrating a first operating condition.

Referring now to the drawings according to FIG. 1, a base plate 1 has installed on it different housing components 2, 3 and 4 containing individual functional members, which are protected by an upper closure plate 5 with other parts of the functional members. Apart from an inlet 6 for the fluid-borne control signal Px which is to be transmitted onward after a required delay period, the base plate 1 may also have other connectors, e.g. a connector 7 for the signal P—which is to be switched through with a delay—of a valve 8 which is integrated into the timing valve described herein, in the present example.

The connector 6 is followed within the component 3 by a passage 9 containing a shutter 10 which leads into a peripheral groove 11 of a plunger 12 displaceable transversely to the passage 9. A side passage 13 leading into a chamber 14 formed in the component 4, which contains a diaphragm 15, departs from the passage 9. The diaphragm 15 is acted upon via the side passage 13 on the one hand, and is acted upon on the other hand by a restoring force applied by a return spring 16.

The component 4 moreover contains a stop 17 for the plunger 12 which is rod-shaped, the stop for example comprising a threaded element which is screwed into a tapped bore 18 of the component 4 and is adjusted to a corresponding position according to the required operating position of the plunger. The stop 17 has a blind bore 19 open at the plunger side, in which is borne the other extremity of the return spring 16. The base 19*a* of the bore 19 in this case simultaneously also acts as an impingement face for the plunger 12.

Alternatively, the blind bore 19 may be omitted, in which case the plunger-side circular surface of the threaded element takes over the stop and spring seat functions. In another modification, an annular groove may be formed in the threaded element which takes over the spring seat function, whereas the central portion of the stop 17 formed by the groove takes over the stop function.

In an advantageous embodiment of the stop 17, the same may be made in arrestable manner, such that the stop may be immobilized rapidly and reliably at predetermined positions co-ordinated with corresponding delay period setting ranges. The detent system is of conventional nature and is preferably formed in resiliently elastic manner.

Regarding the side passage 9, it is also possible to proceed in such manner that the same is in communication with its own connector in the base plate 1, so that the action on the diaphragm 15 may if appropriate be performed hydraulically by means of a different fluid than at the connector 6.

The annular peripheral groove 11 of the plunger 12 is in communication with a transverse passage 20 traversing the plunger, from which departs a longitudinal passage 21 extending axially in the plunger, which opens at the extremity of the plunger which projects into another chamber 22.

Figure 3:
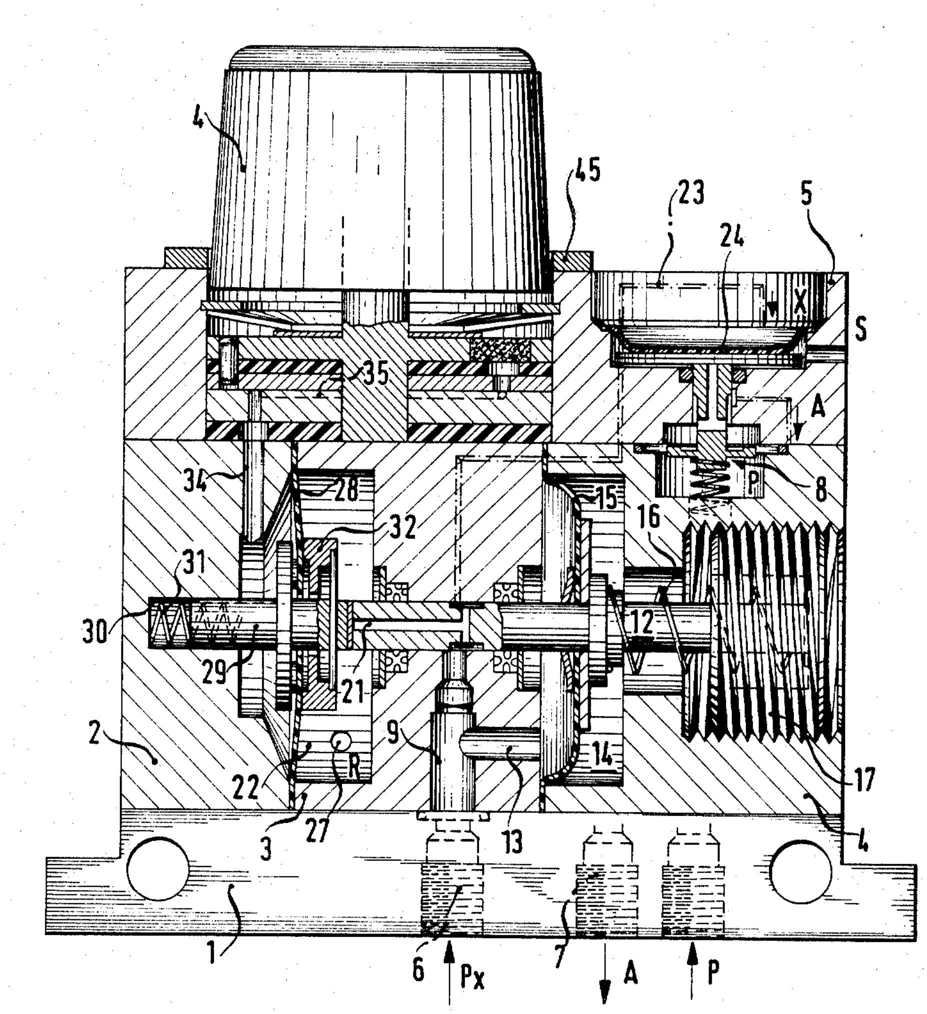
FIG. 3 shows the embodiment in a third operating condition.

A passage 23 shown dash-dotted furthermore leads from the peripheral groove 11 to another diaphragm 24 in the top closure plate 5. This diaphragm exerts a thrust, if a control signal X is present in the passage 23, by means of its actuating plate 25 against the spring-loaded valve element 26 of the valve 8 (FIG. 3), to open the latter.

The other chamber 22 which is in constant communication with the atmosphere via an opening 27 contains the one part of a time-lagging device. This part comprises a diaphragm 28 gripped between the housing components 2 and 3, and a check valve system centrally fastened thereon. The latter comprises the shutter element 29 projecting at either side of the diaphragm 28, the one end 29*a* of which co-operates with the end of the plunger 12 projecting into the chamber 22 and the other terminal portion of which is slidably located in a bore 30 of the component 2. A spring 31 in the hollow other terminal portion of the shutter element 29 ensures that the shutter element is constantly impelled in the direction towards the plunger 12. The shutter element moreover comprises a flange 29*b* determining the initial position of the shutter element, since the flange bears on the component 2 when the plunger 12 exerts a thrust on the shutter element 29. An annular element 32 having a slight axial mobility is seated on the shutter element 29 at the side of the diaphragm 28 turned towards the chamber 22, which is accomplished by means of a flexible coupling stud 33 which is fixedly arranged in the terminal portion 29*a* of the element 29 and has its ends fastened on the annular element 32. The annular element 32 normally clamps the diaphragm 28 between itself and the flange 29*b*, in sealing manner.

The diaphragm 28 divides the other chamber 22 into two spaces. The space present to the left of this diaphragm in accordance with the drawings, is in communication via a connecting passage 34 with the other part of the time-lagging device. The structure of this part is known per se so that it is only briefly described.

An arcuate restrictor groove 35 in a rotarily fixed plate 36 is in communication with the connecting passage 34, the restrictor groove being covered by rotatable adjusting plate 37 having an access hole 38 for atmospheric air, furthermore. The two plates 36, 37 are delimited by two sealing washers 39. The adjusting plate is set by rotation via a plate section 40 of a shaft 41 which is coupled to a rotary knob 42 which is manually adjustable, and via a stud 43 situated in the plate section 40 and engaging in the plate 37. The plate section 40 also has a filter 44 intended to prevent penetration of dirt particles into the access hole 38. The rotary knob 42 furthermore has allocated to it a scale ring 45 on the top plate 5.

In view of the possibility of adjustment of the plunger 12 described in the foregoing, this scale ring may for example comprise three scales, each scale corresponding to a required time lag setting range starting from zero, each scale being of identical length. The length of the scales then substantially utilizes the entire arc length of the restrictor groove 35.

The timing valve described operates in the following manner:

Let it be assumed that the longest possible time-lag is to be used, which means that the stop 17 is set towards the right, so far that the plunger is displaced through its maximum stroke.

Figure 2:
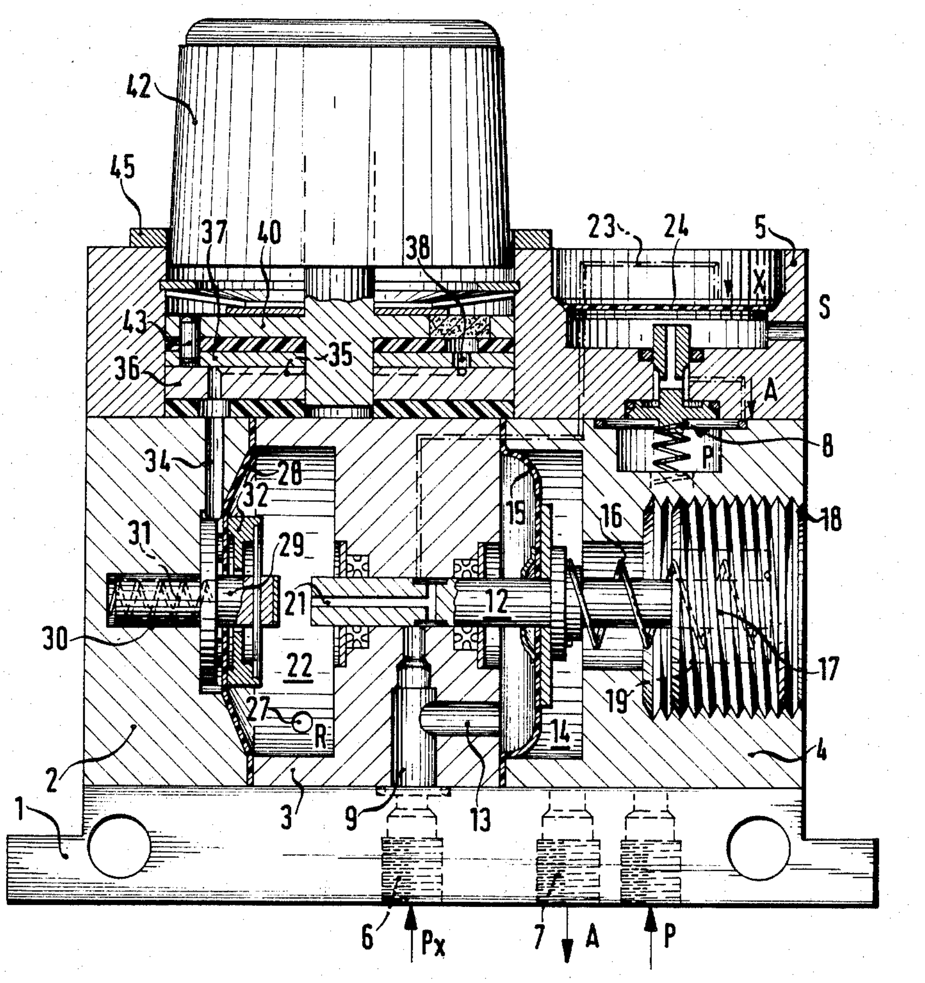
FIG. 2 shows the embodiment in a second operating condition.

FIG. 1 shows the initial position of the timing valve. If a pneumatic pressure signal Px is present at the connector 6, the diaphragm 15 is acted upon via the side passage 13, so that the plunger 12 is displaced towards the base 19*a* of the bore of the stop 17. FIG. 2 shows this condition. The signal then passes via the peripheral groove 11, the bores 20 and 21, into the chamber 22 and is initially "vented" to the atmosphere via the opening 27. At the same time, the spring 31 moves the shutter element 29 whilst producing a negative pressure in the space to the left of the diaphragm 28, in the direction towards the plunger 12. The shutting speed of the shutter element 29 and thus the delay period up to impingement of the shutter element on the plunger extremity, is then determined by the flow path—set to a maximum—of the groove restrictor 35. When the shutter element reaches contact with the plunger extremity (FIG. 3), it shuts off the bore 21, so that the control signal X is then transmitted via the passage 23 to the diaphragm 24 and thereby to the valve element 26, thereby opening the valve 8 and causing onward transmission of a signal P separately present at the valve 8. When the signal Px decays at the connector 6, the spring 16 returns the plunger 12 to its initial position, by pushing the shutter element 29 back against its considerably weaker spring 31. Whilst this occurs, the collar 29*b* is lifted slightly off the diaphragm 28 which is assisted by the air pressure in the space to the left beside the diaphragm 28 since this air pressure initially represents a definite abutment. Due to the flange 29*b* being lifted off, the air in the space just referred to may however enter via the central opening of the diaphragm 28 into the chamber 22 and escape to the atmosphere via the opening 27.

If a time-lag is to be set which is substantially shorter than the possible maximum delay period, in precise manner, the stop 17 is screwed in up to a mark, in the direction of a range changeover, so that a smaller stroke is then available for the plunger 12 and thus also for the shutter element 29, which has again allocated to it the maximum flow path of the groove restrictor 35, for the precise adjustment of time.

Within a time-lag range, it is merely the flow path of the groove restrictor 35 which is shortened in conventional manner by displacement of the adjusting plate 37, thereby resulting in shortening the time lag.

I claim:

1. In a pneumatic timing valve of the kind comprising a housing, a plunger displaceably situated in said housing, a means responsive to fluid pressure cooperating with said plunger, passage means movable by said plunger, a chamber disposed in said housing and connected to said passage means, said plunger having one end thereof projecting into said chamber, and being displaced into an operating position by a fluid pressure acting on said means responsive to fluid pressure, said chamber having an opening in constant communication with the atmosphere, so as to initially release an incoming fluid pressure, a shutter element situated in said chamber, spring means and a restrictor system cooperating with said shutter element so as to control said shutter element with respect to time, said restrictor system incorporating a restrictor path which is adjustable in its effective length and separately in communication with the atmosphere, said shutter element coacting with said passage means movable by said plunger, to neutralize the relief of the pressure signal after a set delay period has elapsed, so as to generate a control signal, the improvement which comprises adjustable stop means for setting the operating position of the plunger.

2. A timing valve according to claim 1, wherein said stop means comprise a stop manually adjustable in the direction of displacement of the plunger, which stop is situated in the housing, the other end of the plunger coming into contact with said stop.

3. A timing valve according to claim 2, wherein said stop comprises a threaded element screwed into said housing.

4. A timing valve according to claim 2, wherein said means responsive to fluid pressure comprises a return spring of said plunger, and said stop has a central blind bore which receives one end of the return spring of said plunger, and the other end of said plunger comes into contact with the base of said blind bore.

5. A timing valve according to claim 3, wherein said means responsive to fluid pressure comprises a return spring of said plunger, and at the plunger side, said stop has an annular groove which receives one end of said return spring of said plunger, and the central part of said stop surrounded by said annular groove serves as an impingement face.

6. A timing valve according to claim 2, wherein said stop comprises arrestable means for immobilizing said stop at predetermined positions coordinated with corresponding delay period setting ranges.

* * * * *